United States Patent
Rojeck et al.

(10) Patent No.: US 7,865,419 B2
(45) Date of Patent: Jan. 4, 2011

(54) SYSTEMS AND METHODS FOR GENERATING A METRIC OF FINANCIAL STATUS RELATIVE TO A FINANCIAL GOAL

(75) Inventors: Richard P. Rojeck, P.O. Box 9485, Rancho Santa Fe, CA (US) 92067; Carlos Bazan, San Diego, CA (US)

(73) Assignee: Richard P. Rojeck, Rancho Santa Fe, CA (US)

( * ) Notice: Subject to any disclaimer, the term of this patent is extended or adjusted under 35 U.S.C. 154(b) by 370 days.

(21) Appl. No.: 12/020,509

(22) Filed: Jan. 25, 2008

(65) Prior Publication Data

US 2008/0215501 A1    Sep. 4, 2008

Related U.S. Application Data

(60) Provisional application No. 60/897,608, filed on Jan. 25, 2007.

(51) Int. Cl.
*G06Q 40/00*    (2006.01)
(52) U.S. Cl. ...................................... 705/36 R; 705/35
(58) Field of Classification Search ............... 705/36 R, 705/35
See application file for complete search history.

(56) References Cited

U.S. PATENT DOCUMENTS

| 5,878,405 A | * | 3/1999 | Grant et al. | .................... 705/39 |
| 6,021,397 A | * | 2/2000 | Jones et al. | ............... 705/36 R |
| 2005/0144108 A1 | * | 6/2005 | Loeper | ........................ 705/36 |

OTHER PUBLICATIONS

Chakraborty, D., & Patel, M.. (Jan. 1). A Mixed-Integer Programming Model for Retirement Planning. IIE Annual Conference. Proceedings,1752-1757. Retrieved Aug. 11, 2010.*

* cited by examiner

*Primary Examiner*—Charles R Kyle
*Assistant Examiner*—Kito R Robinson
(74) *Attorney, Agent, or Firm*—Gordon & Rees, LLP

(57) ABSTRACT

The present invention relates to, among other things, systems and methods for generating a metric of an entity's financial status relative to a financial goal. In generating the metric, the value of an entity's total assets is simulated over time based on data comprising historical rates of returns. In one embodiment, the present invention provides a computer system and method for generating a metric of an individual's probable present-day financial status relative to financial independence on a desired future date. In this embodiment, the metric is called a Financial Independence Score. The Financial Independence score is a single number that represents the individual's financial status relative to achieving financial independence by a desired date.

8 Claims, 10 Drawing Sheets

1.) What is your age?

2.) What is your gender?

3.) At what age do you wish to achieve your financial goal?

4.) What amount of annual income would you like in today's dollars when you achieve your financial goal?

5.) What rate of inflation should be assumed for this income objective?

6.) Do you wish to preserve or consume your assets?

7.) What is your current income?

8.) What rate of growth should be assumed for your income?

9.) How many years will you work after achieving your goal?

10.) If you intend to work after achieving your goal, what percentage of your current income to you expect to earn?

11.) What is the value of any other assets that will be available to you after you achieve your goal?

12.) If a member of a defined benefit pension plan, what percentage of your income will it pay you upon retirement (enter 0 if not a member)?

13.) Are you eligible for Social Security benefits?

*FIG. 2A*

|  | Personal Investments | | | | Retirement Accounts | |
| --- | --- | --- | --- | --- | --- | --- |
|  | Annuities | | | | Roth | Non-Roth |
| Current Balance | $ | | | | $ | $ |
| Annual Savings as % of Income | % | | | | % | % |
| Annual Employer Contributions as % of Income | % | | | | % | % |
|  | Money Market | Bonds | Tax Exempt Bonds | Stocks | Real Estate | Other |
| Asset Allocation | % | % | % | % | % | % |

*FIG. 2B*

1.) What is your age?

> 28

2.) What is your gender?

> M

3.) At what age do you wish to achieve Financial Independence?

> 55

4.) What amount of annual income would you like in today's dollars when you achieve Financial Independence?

> $50,000

5.) What rate of inflation should be assumed for this income objective?

> 3%

6.) Do you wish to preserve or consume your assets?

> Preserve

7.) What is your current income?

> $40,000

8.) What rate of growth should be assumed for your income?

> 10%

9.) How many years will you work after achieving Financial Independence?

> 0

10.) If you intend to work after achieving Financial Independence, what percentage of your current income to you expect to earn?

> 0

11.) What is the value of any other assets that will be available to you after Financial Independence?

> 0

12.) If a member of a defined benefit pension plan, what percentage of your income will it pay you upon retirement (enter 0 if not a member)?

> 0

13.) Are you eligible for Social Security benefits?

> YES

*FIG. 10A*

|  | Personal Investments | Retirement Accounts | |
|---|---|---|---|
|  | Annuities | Roth | Non-Roth |
| Current Balance | $5,000 | $0 | $8,500 |
| Annual Savings as % of Income | 5% | 0% | 6% |
| Annual Employer Contributions as % of Income | 0% | 0% | 3% |

|  | Money Market | Bonds | Tax Exempt Bonds | Stocks | Real Estate | Other |
|---|---|---|---|---|---|---|
| Asset Allocation | 50% | 50% | 0% | 0% | 0% | 0% |

*FIG. 10B*

SYSTEMS AND METHODS FOR GENERATING A METRIC OF FINANCIAL STATUS RELATIVE TO A FINANCIAL GOAL

CROSS-REFERENCE TO RELATED APPLICATIONS

The present application claims priority under 35 U.S.C. §119(e) to U.S. provisional application Ser. No. 60/897,608 filed Jan. 25, 2007.

FIELD OF THE INVENTION

The present invention relates generally to computer systems and methods for measuring an entity's progress toward achieving a financial goal. In one embodiment, the present invention relates to computer systems and methods for generating a metric representing an individual's financial status relative to achieving financial independence.

BACKGROUND OF THE INVENTION

In recent years there has been increasing concern about how little Americans save compared to how much they spend. In fact, the U.S. Commerce Department reported that for the year 2005, the personal savings rate of Americans fell into negative territory for the first time since the Great Depression in 1933. Perhaps this should not be surprising considering that the number of commercial messages to spend and consume vastly outnumber those to save and invest. In any case, the increasing propensity of Americans to spend more than they save is a troubling trend.

Also in recent years, there has been discussion about the future long-term viability of the U.S. Social Security system as more Americans live longer and longer lives. However, regardless of its future viability, the Social Security system was never intended to provide complete financial independence for its recipients, but instead was only intended to provide an economic "safety net." Thus, Americans who spend more than they save in the belief that Social Security alone will provide for their desired standard of living may be in for a rude awakening as they near retirement age.

One reason that many Americans spend more than they save is that they do not truly understand or are unable to easily measure their own financial status. Although displays of wealth such as the size of one's home or the year and make of one's car have effectively become subjective measures of consumer status, this tells an individual almost nothing about their financial status and their progress toward a financial goal. Likewise, although a credit score (such as the FICO® score by Fair Isaac Corp., Minneapolis, Minn.) provides a simple objective measure of an individual's credit worthiness, this information similarly tells the individual very little about their financial status relative to a financial goal. Without a simple objective measure of financial status, many Americans continue their spending habits in blissful ignorance of the earnest need to begin a savings plan.

While financial professionals, such as Certified Financial Planners, are equipped to give advice on how to reach a financial goal, only a small percentage of Americans actually seek out their help. One reason for this reluctance may be that, without a readily available objective measure of their financial status, many people do not realize how immediate and serious the need to implement a savings plan actually is. Accordingly, many individuals do not seek out professional financial advice until after they understand their financial status, but they do not truly understand their financial status until after they seek out professional financial advice. Thus, if individuals were able to objectively quantify their financial status without first seeking out professional financial advice, it is likely that many more people would realize the immediate importance of creating a savings plan, and therefore it is also likely that many more people would then seek out professional financial advice.

One difficulty in quantifying financial status relative to a financial goal, is the fact that the future is uncertain. Even if a given class of investments has a stable average historical rate of return, there is no guarantee that in any one year the rate of return will be equal to or even close to the average historical rate. Thus, a deterministic calculation of the future value of an investment based on an average historical rate may not be an accurate prediction, particularly where the actual rate of return in the first few years is drastically different from the average rate of return.

In order to overcome the difficulties associated with making deterministic predictions about an uncertain future, it is well known in the art to use modeling techniques generally known as Monte Carlo methods or simulations. In a Monte Carlo simulation of the future value of an investment (or portfolio of investments), historical data on the investment's rate of return is generally fitted to a probability distribution. Based on the probability distribution, possible rates of return are generated for a plurality of intervals (such as one year) within a given period of time. Essentially, a Monte Carlo simulation of the value of an investment models a large number of possible paths the value of an investment can take over a period of time (with the rate of return varying for each of the plurality of intervals within the period), and then predicts the probability that the value will reach a certain threshold value by the end of that period. The larger the number of paths simulated, the more accurate the prediction will be.

Thus, a Monte Carlo simulation of the value of an investment basically creates a large number of simulated investments, and models them over a period of time, accounting for varying rates of return over the simulated time period. Depending on when (i.e. in what year of the time period) and how much the rates of return depart from average, some of the simulated investments will reach the threshold value by the end of the time period and some will not. By comparing the number of simulated investments that reach the threshold value to the number of those that do not, a probability that an actual investment will achieve the threshold value in real life can be determined. Accordingly, a Monte Carlo simulation accounts for the inherent uncertainty in the future in a way that a deterministic simulation cannot.

Systems and methods exist for using Monte Carlo methods to determine the probability that an investment will reach a threshold value by the end of a period of time. For example, U.S. Pat. No. 7,031,935 discloses such systems and methods. However, the systems and methods disclosed therein only determine the probability of an investment attaining a certain value; they do not provide information about an investor's probable financial status relative to a financial goal. The probability of achieving a financial goal is not the same as a measure of one's progress toward a financial goal, because the latter lets the individual know whether they are saving at a sufficient rate to achieve their goal.

In summary, without a simple objective measure of financial status, very few Americans are aware of their actual progress relative to a financial goal, such as retirement or financial independence. If equipped with a firm understanding their financial status relative to a financial goal, many people would objectively understand the importance of saving for the first time, and would therefore begin saving in earnest much sooner than they otherwise would have. Accordingly, there is a need for a simple objective measurement of an individual's financial status relative to a financial goal, such as financial independence.

SUMMARY OF THE INVENTION

The present invention satisfies this need by providing, among other things, a system for generating a metric of an entity's financial status relative to a financial goal. The system includes and input device for inputting entity data and an output device for outputting the metric, as well as memory for storing and a processor for processing such data. The memory also contains instructions operable on the processor to cause the system to carry out the novel aspects of the present invention.

The entity data generally includes at least a value of the entity's income, a value of the entity's actual capital, a value of the entity's actual savings, a future date (or, alternatively, the entity's present age and the entity's desired age of achieving a financial goal), and a desired income on the future date.

The value of the entity's total assets (determined based on the entity data inputted into the system) is then simulated over time based on historical rates. The simulation may be deterministic or based on probability theory, such as a Monte Carlo simulation. Based on the results of the simulation, a required capital is determined. A required capital is equal to the present value of capital that is alone sufficient, if compounded at a particular rate until a desired date of achieving a financial goal, to alone provide a particular probability of achieving a financial goal.

A capital deficit is then determined. The capital deficit is equal to the difference between the future value of an actual capital and the future value of a required capital. Using the capital deficit, a required savings is determined. The required savings is an amount of annual savings in a first year that will equal the capital deficit if savings continues at this annual rate (adjusted for inflation) until a desired date of achieving a financial goal, and if the total accumulated savings are compounded at a particular rate until the desired date.

Next, a capital ratio is determined. The capital ratio is equal to the present value of an actual capital divided by the present value of a required capital. A savings ratio is calculated next. The savings ratio is equal to an actual savings divided by a required savings.

Finally, a metric of an entity's financial status relative to achieving a financial goal is generated. The metric is equal to the sum of the capital ratio and savings ratio. If the metric is equal to one, there is a particular probability of achieving the financial goal on the desired date. The metric is then outputted by the system, generally for review by the entity.

BRIEF DESCRIPTION OF THE DRAWINGS

FIGS. 2A and 2B depict an input screen showing the prompts displayed to a user in one embodiment of the invention.

FIGS. 10A and 10B depict an input screen showing the prompts displayed to a user in one embodiment of the invention, along with the user's responses to the prompts.

DETAILED DESCRIPTION

The present invention relates to, among other things, systems and methods for generating a metric of an entity's financial status relative to a financial goal. In one embodiment, the present invention provides a computer system and method for generating a metric of an individual's present-day financial status, or probable present-day financial status, relative to financial independence on a desired future date. In this embodiment, the metric is called a Financial Independence Score ("FI score"). The FI score is a single number that represents the individual's financial status relative to achieving financial independence by a desired date.

The metric is equal to the sum of a capital ratio and a savings ratio, as will be explained in further detail below. The capital ratio is the ratio of the value of an entity's current actual capital to the value of capital required to provide a particular probability of achieving a financial goal on future date. The metric is calculated at least from data inputted into the system by a user, but may also be calculated from a combination of data stored in memory and data inputted by the user. In an embodiment where the metric is an FI score, an FI score of exactly one indicates that the individual is exactly on pace (or has a certain probability of being exactly on pace) to achieve financial independence by a desired date. An FI score less than one indicates that the individual is below the necessary pace (i.e. not saving money at a sufficient rate) to achieve financial independence by the desired date. An FI score greater than one indicates that the individual is above the necessary pace.

It is to be understood that the FI score (or other metric) may have additional mathematical operations performed upon it (such as being scaled higher or lower) without departing from the spirit of the invention. For example, if the sum of the capital ratio and savings ratio is multiplied by 100, a resulting FI score of 100 would indicate that the individual is saving money at exactly the necessary rate to achieve financial independence on a desired date.

Figure 1:
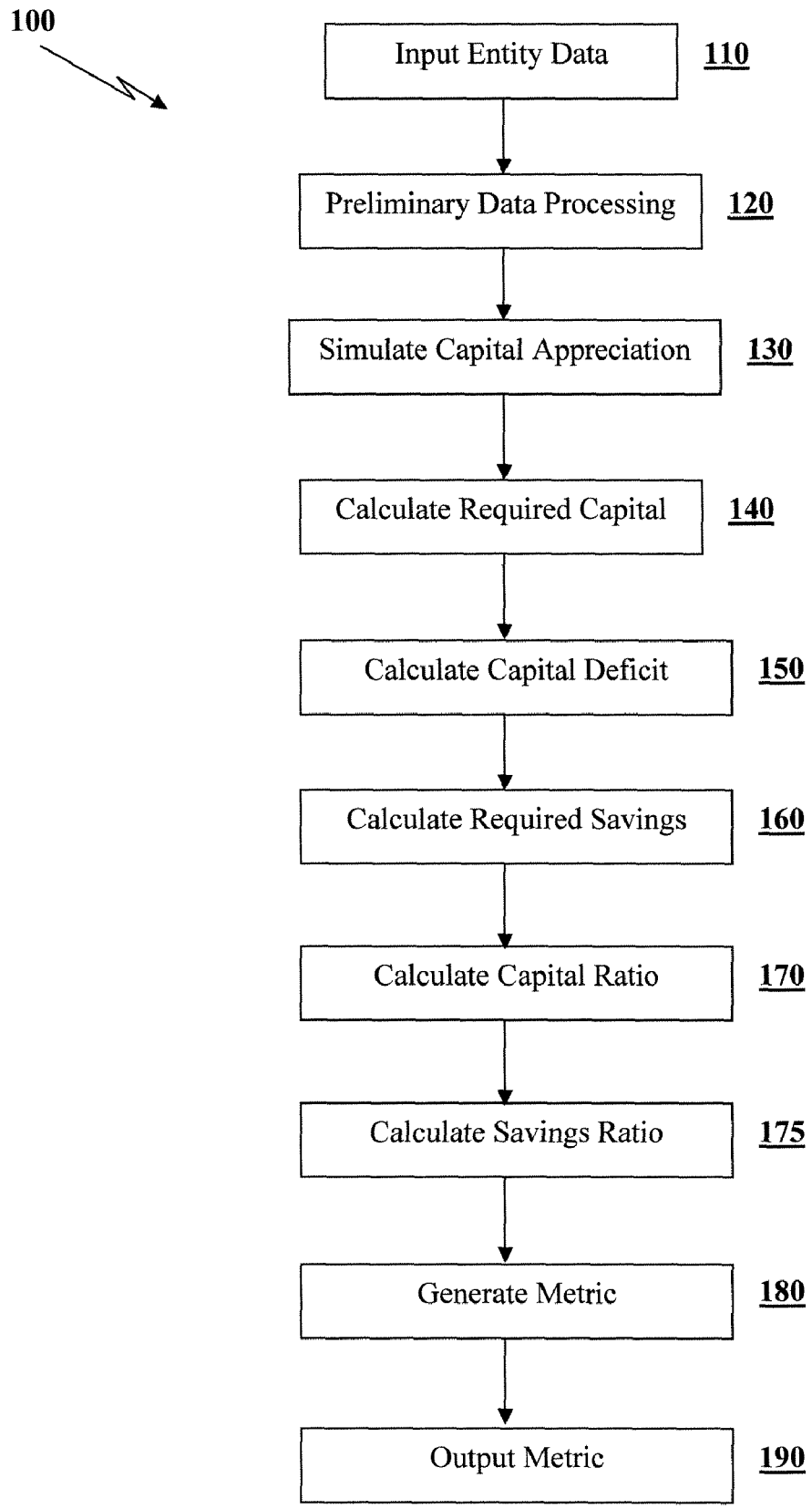
FIG. 1 is a flow chart showing the main steps of generating a metric of financial status relative to a financial goal.

As shown in FIG. 1, the process of using a system of the present invention to generate a metric of financial status relative to a financial goal begins when a user enters entity data into the system using an input device (110). The data is stored in variables in memory and then undergoes preliminary data processing (120) necessary to conduct a simulation of future appreciation of the entity's total accumulated capital (130). The simulation of capital appreciation (130) may be deterministic or may be a Monte Carlo simulation. Using the results of the simulation, the required capital necessary to provide a particular probability of achieving a financial goal on future date is determined (140). By comparing the required capital with the actual capital, a capital deficit is determined (150), and then used to calculate a required savings (160). A capital ratio is calculated (170) by dividing the actual capital by the required capital. A savings ratio is calculated (175) by dividing the actual savings by the required savings. The metric is generated (180) by calculating the sum of the capital ratio and the savings ratio. Finally, the metric is outputted (190) from the system via an output device.

The terminology used herein (including terminology previously used above) should be accorded its ordinary meaning, unless otherwise indicated. Some guidance as to the meaning of frequently used terminology is provided below:

Entity: Any individual, group of individuals (including a married couple or other family unit), partnership, business, trust, or the like, that is capable of owning property.

User: A person entering data into the system. The user may be the entity, or the user may be entering data on behalf of an entity, whether or not the user is an individual who is part of or otherwise associated with the entity.

Financial goal: A desired income on a future date, from whatever source that income is derived.

Financial independence: The state of having a sum of invested assets and other resources that is alone sufficient to meet a financial goal, adjusted for inflation.

Metric: A standard of measurement.

Present value: The worth of a sum of money on the present date, including the worth of a future stream of payments and/or future sum of money, after accounting for inflation and/or returns on investments.

Future value: The worth of a sum of money on a future date, including the worth of a future stream of payments and/or future sum of money, after accounting for inflation and/or returns on investments.

Actual capital: The present value of an entity's existing investable assets (including the present value of vested accrued benefits of pension plans, social security, and other benefits after accounting for applicable income taxes).

Required capital: The present value of capital that is alone sufficient, if compounded at a particular rate until a desired date of achieving a financial goal, to alone provide a particular probability of achieving a financial goal. In one embodiment this probability is 75%.

Capital deficit: The future value of an actual capital subtracted from the future value of a required capital.

Actual savings: The total annual contributions to any of an entity's savings and/or investment vehicles, whether the contributions are made by the entity or by a third-party.

Required savings: An amount of annual savings in a first year that will equal the capital deficit if savings continues at this annual rate (adjusted for inflation) until a desired date of achieving a financial goal, and if the total accumulated savings are compounded at a particular rate until the desired date.

Capital ratio: The present value of an actual capital divided by the present value of a required capital.

Savings ratio: An actual savings divided by a required savings.

Computer: Any machine or apparatus that is capable of receiving, performing logic operations on, storing, and/or outputting data. Multiple computers connected by a network may be considered a single computer.

Input device: Any device capable of accepting data entered by a user for use by a computer. An input device may considered a component of a computer.

Output device: Any device capable of delivering data or a representation of data from a computer. An output device may be considered a component of a computer.

Memory: Any volatile or persistent medium on which a computer can store information for any length of time, including without limitation an electrical circuit, a magnetic disk, an optical disk, random access memory, and read only memory. A memory may be a single medium or may encompass and/or be distributed across a plurality of media, including a plurality of media distributed across a plurality of computers.

Processor: Any logic circuitry capable of responding to computer-readable instructions to cause a computer to perform a task.

Variable: A symbolic representation of a numerical or mathematical quantity, expression, or relationship. As used herein, variables are generally (but not necessarily) stored in the memory of a computer to represent a numerical or mathematical quantity, expression, or relationship. Variables may be, without limitation, scalars, hashes, or arrays of any dimensions.

Data Input

As shown in FIG. 1, as a first step the system prompts the user to input entity data (110). Entity data generally includes at least a value of the entity's income, a value of the entity's actual capital, a value of the entity's actual savings, a future date (or, alternatively, the entity's present age and the entity's desired age of achieving a financial goal), and a desired income on the future date. In one embodiment, income includes only earned income. Alternatively, income may additionally include unearned income derived from any source.

Entity data may also include, without limitation, the entity's present age, the entity's desired age of achieving a financial goal, an individual's gender, whether the entity desires to preserve or consume invested assets, the entity's anticipated income growth rate, the number of years an entity is willing to be employed after achieving a financial goal, whether the entity is eligible for Social Security benefits, a value of the entity's pension benefits (if any), the entity's invested asset allocation between various investment vehicles, the entity's income tax rate, and the values of any other of the entity's assets that will be available after the future date. Applicable taxes may or may not be accounted for by the user prior to entering the data. The system may substitute default values (previously stored in memory) for any data not entered by the user, or for any invalid data entered by the user.

As each entity datum is inputted by the user, it is stored in memory by the system. In one embodiment, each datum is stored in memory as a variable for later use in generating the metric.

An input screen of one embodiment of the invention is shown in FIGS. 2A and 2B. The screen displays input prompts to the user, and the user inputs responses to the prompts in text boxes using a keyboard or other input device. The layout and content of the prompts shown in FIGS. 2A and 2B are intended to be representative of typical prompts to be displayed to a user of the system, and are not intended to be limiting in any way.

Preliminary Data Processing

After the user is finished inputting entity data, the next step is to process the entity data to calculate preliminary values necessary for generation of the metric (120), and to store those values in memory as variables. These variables are needed for the simulation of future inflation and investment return rates, discussed below.

During preliminary data processing (120), first a desired time to achieving a financial goal is determined. This value is equal to the number of years from the present date to the desired date of financial goal achievement (which may be calculated based on the user's present age and desired age of goal achievement).

Next, the entity's estimated age of death may also be calculated based on the user's input. If the entity is a married couple, the estimated age of death may be for either spouse individually, or it may be an average or other combination of both estimates. Using an actuarial table or the like stored as a database in memory, the system looks up the estimated life expectancy of a person(s) having the entity's present age(s) and gender(s). The process of a computer retrieving information from a database is well known in the art.

In one embodiment, the estimated life expectancy is stored in memory as a variable. This estimated life expectancy variable is particularly important if the entity wishes to consume the principal of invested assets after achieving the financial goal, because in that situation it is crucial to ensure that the entity does not consume all of the principal before the end of the entity's lifespan. For example, where the entity is an individual, the individual must not consume all of his or her assets before death.

The next step in preliminary data processing (120) is to estimate the entity's future income for each year until at least the desired date of achieving the financial goal, assuming the user inputted the entity's current income. If the user additionally entered an expected income growth rate, the system uses this rate to calculate the future income for each year. Alternatively, if the user did not enter an expected income growth rate, the system may substitute a default income growth rate, which may be retrieved from a database (stored in the system's memory) of historical inflation rates and/or income growth rates. Also alternatively, the default income growth rate may be based on a simulated inflation rate. The process of generating a simulated inflation rate is described in further detail below. In one embodiment, the estimated future income is stored in memory as an array having at least one entry for each year until the desired date of financial goal achievement.

Simulation of Capital Appreciation Over Time

After preliminary entity data processing (120), the next step is to use historical data to simulate, for each year until end of the entity's lifespan or until the desired date of financial goal achievement ("the simulation period"), future rates of inflation and future rates of return from various types of investments ("the future rates") (130). Future rates of inflation are simulated based on historical inflation data. Future rates of return can be simulated for any investment or class of investments for which historical data exists, including without limitation equities, bonds, treasury bills, treasury notes, real estate, and commodities, or any combination thereof. Using these simulated rates, the value (or probable value) of the entity's total capital on the future date can be determined using known methods discussed below.

An example of the historical data that may be used are the historical returns of the Standard & Poor's 500 Index ("S&P 500"). Alternatively, the historical returns of other equity indexes such as the Dow Jones Industrial Average may be used. Also alternatively, the historical returns of individual stocks or groups of stocks may be used. Similarly, historical returns data exists for each of the investment vehicles mentioned above. In one embodiment, all of this historical data is stored in a database in the system's memory.

In one embodiment, the future rates are simulated (130) for each year of the simulation period as the average rates over a selected period of the historical data. This is the simplest method of simulating the future rates. However, for any given year, an actual rate may depart drastically from the historical average rate. Accordingly, this simulation method does not account for the uncertainties inherent in predicting the future rates. Particularly where the simulation period is relatively short, or where an actual rate in an early year of the simulation period is drastically different from the simulated rate, this can lead to an inaccurate forecast.

For example, if the actual rate of return on investments in the first year of the simulation period is drastically below the historical average rate, the actual overall return of the investment at the end of the simulation period is likely to be far less than the predicted return. This may be true even if the overall actual average annual rate of return over the simulation period is close to the historical average. Thus, although simulating the future rates by taking a historical average of past rates is simple and reasonably accurate in many cases, it may lead to an unreliable forecast if the rate in a given year drastically departs from the average, particularly if that year is early in the simulation period or if the simulation period is relatively short.

Figure 3:
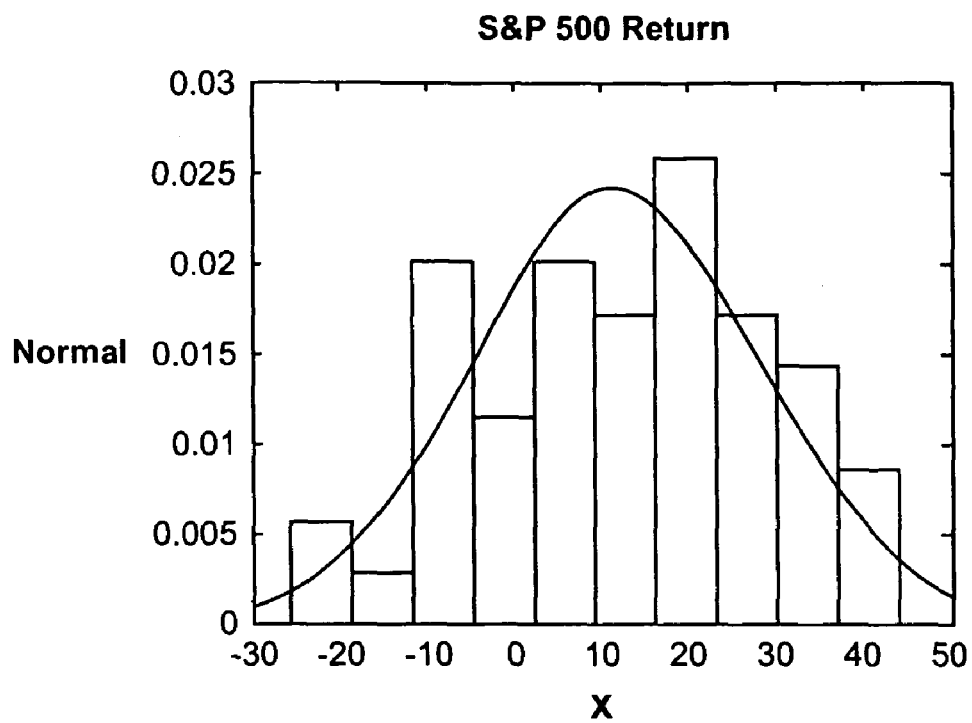
FIG. 3 shows a normal probability distribution fitted to a probability distribution of historical S&P 500 returns.
Figure 4:
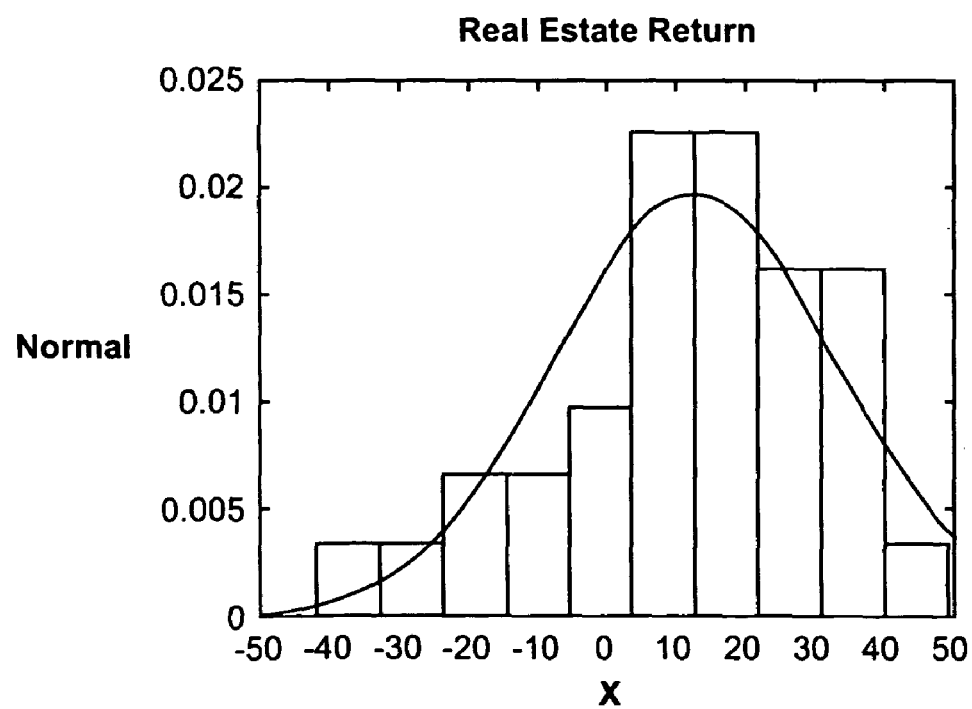
FIG. 4 shows a normal probability distribution fitted to a probability distribution of historical real estate returns.
Figure 5:
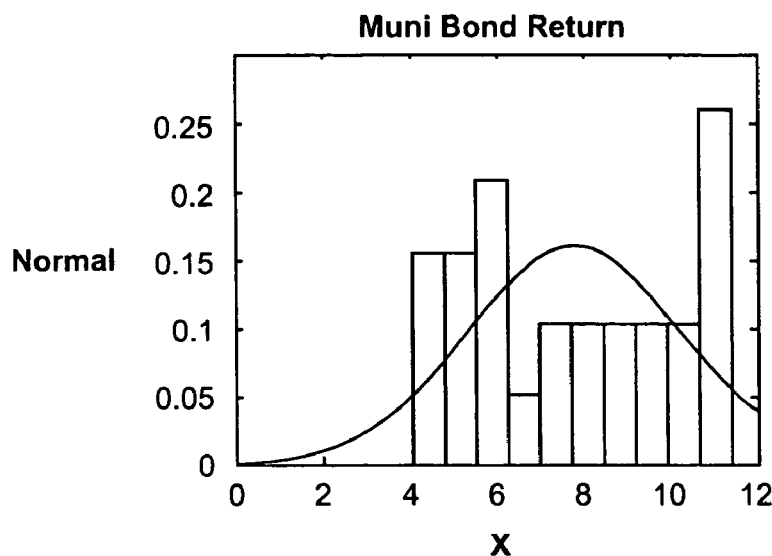
FIG. 5 shows a normal probability distribution fitted to a probability distribution of historical municipal bond returns.
Figure 6:
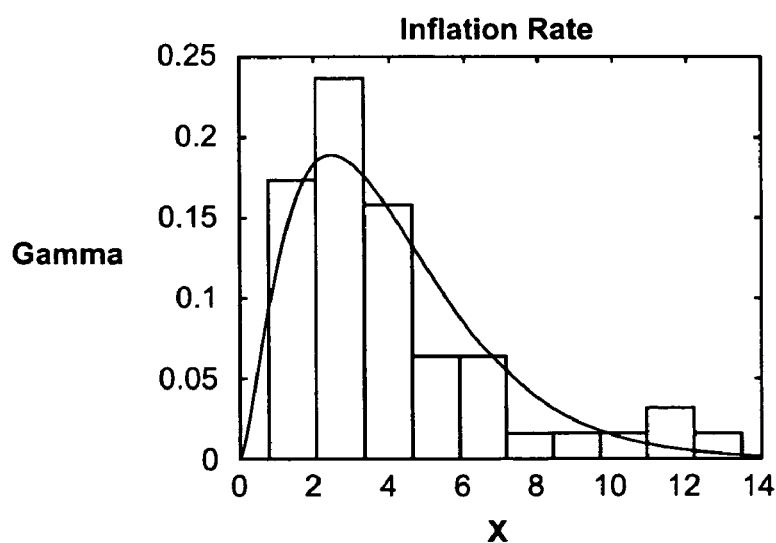
FIG. 6 shows a Gamma probability distribution fitted to a probability distribution of historical inflation rates.
Figure 7:
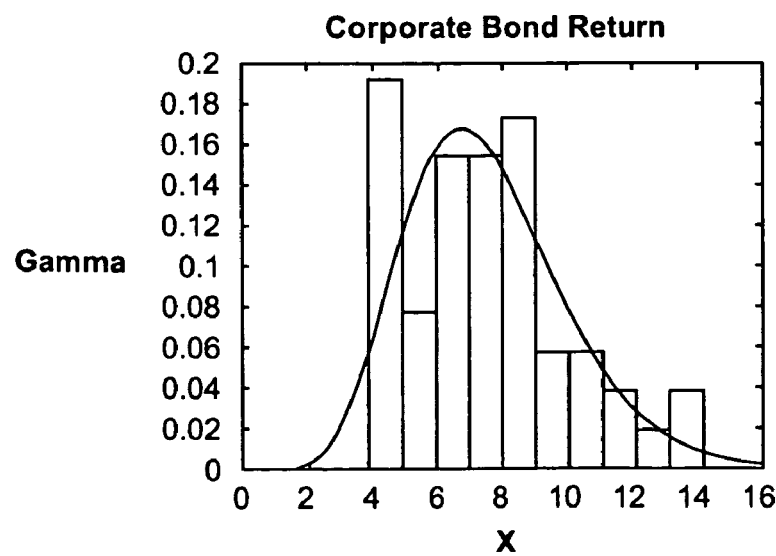
FIG. 7 shows a Gamma probability distribution fitted to a probability distribution of historical corporate bond returns.
Figure 8:
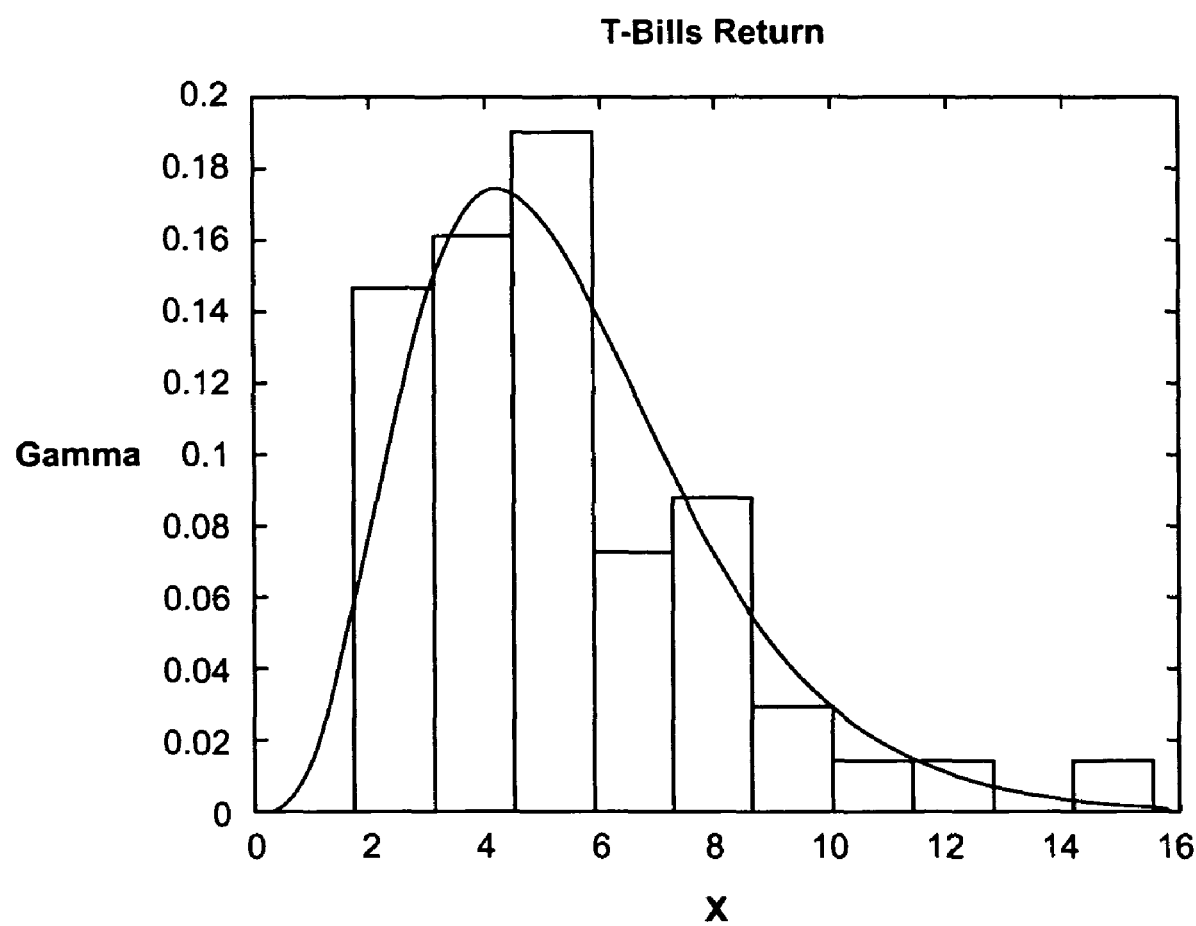
FIG. 8 shows a Gamma probability distribution fitted to a probability distribution of historical U.S. Treasury bill returns.

Accordingly, in order to account for the inherent uncertainty in predicting the future rates, known Monte Carlo simulations are used in one embodiment to predict the probable value of the entity's total assets on the desired date of financial goal achievement. The first step in these simulations (130) is to model the historical data for inflation rates and investment return rates according to a known probability distribution that the data most closely follows. For example, as seen in FIG. 3, the historical returns of the S&P 500 closely follow a normal probability distribution. FIGS. 4-8 respectively show the historical rates of return on real estate, rates of return on municipal bonds, inflation rates, rates of return on corporate bonds, and rates of return on U.S. Treasury bills, along with the corresponding probability distribution that most closely fits the historical data. In one embodiment, normal probability distributions are used to model equity returns, real estate returns, and municipal bond returns, while Gamma probability distributions are used to model the inflation rate, corporate bond returns, and treasury bill returns. Each probability distribution represents the likelihood of a given rate occurring in any one year (or other time interval).

Based on the probability distribution selected as a model, possible future rates are generated for each one year (or other) interval in the simulation period. This is done for a large number of simulated paths that the value of a known capital may take over the simulation period. For example, in one embodiment there may be 5,000 simulated paths. The possible future rates are stored in variables in memory, preferably in arrays having at least one entry for each year of the simulation period.

Figure 9:
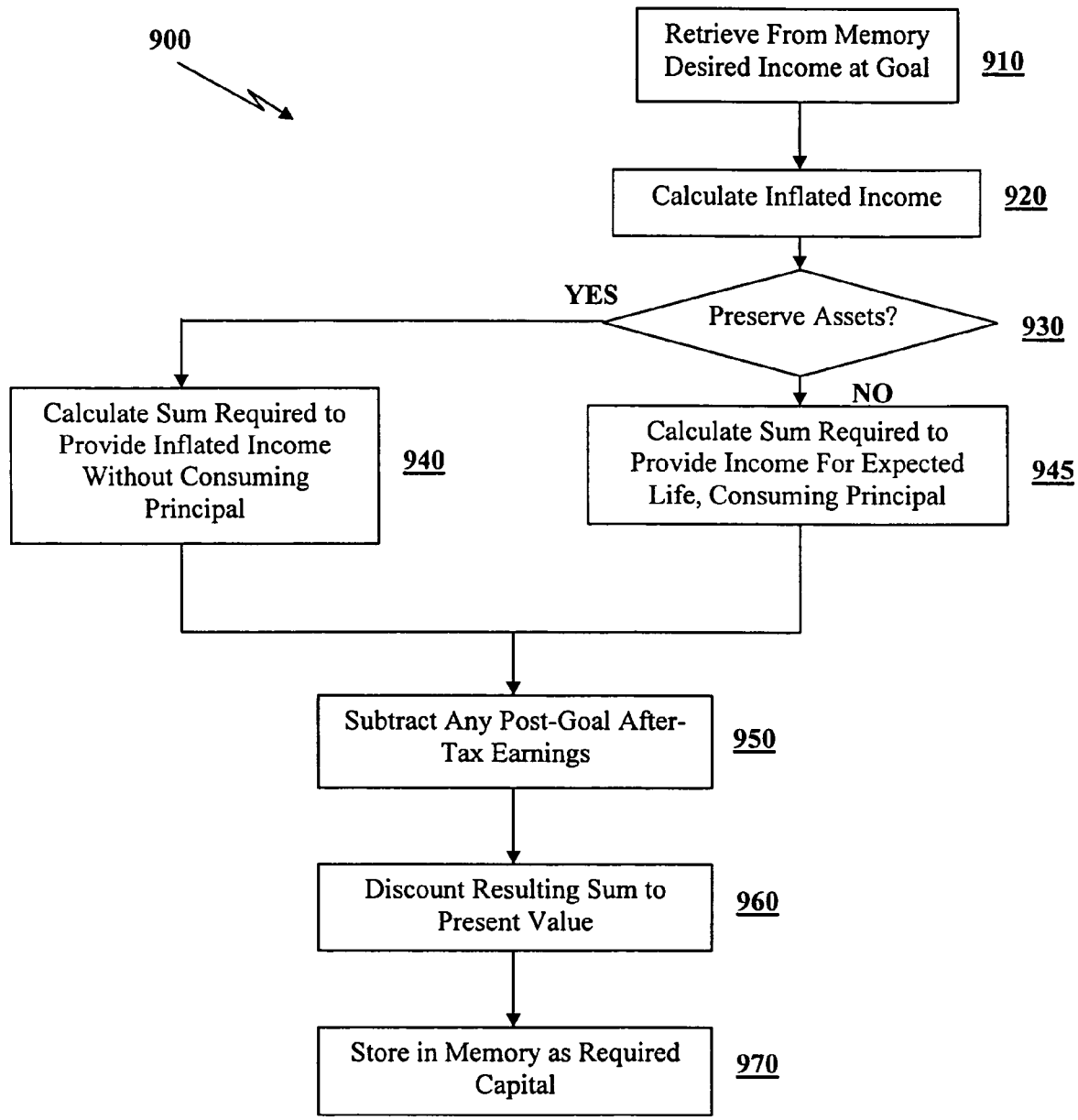
FIG. 9 is a flow chart showing the process of calculating the required capital.

The next step is to determine the required capital (140), as shown in FIG. 9. To do so, the outcomes of each simulated path are compared to a threshold value. In one embodiment, this threshold value is the value of capital that will provide the entity's desired income on the future date (assuming, or alternatively generating based on a probability distribution, a particular rate of return on that date), after adjusting for inflation. In one embodiment, the threshold value is determined by retrieving from memory the entity's desired income on the date of financial goal achievement (910), and then inflating it based on historical inflation rates until the date of financial goal achievement (920) to produce an inflated income. If the entity wishes to preserve its assets (930) after achieving the financial goal, the amount of money necessary to provide the inflated income without consuming principal is determined according to well known methods (940). Conversely, if entity is willing to consume its assets (930), the amount of money necessary to provide the inflated income while consuming principal is determined according to standard methods (945). From the amount of money thus calculated (940) or (945) is subtracted any after-tax income the entity expects to earn after achieving the financial goal (950). This amount is then discounted to present value (960) using simulated rates of return and accounting for the entity's asset allocation. In one embodiment, this amount is discounted to present value (960) using simulated rates of return generated in a Monte Carlo simulation, such that there is a 75% chance that capital having the discounted value will appreciate to the threshold value by the desired date of financial goal achievement. This process is explained further below. The present value of the amount thus determined is the required capital, which is stored in memory as a variable for later use (970).

To determine an amount such that there is a given probability that capital having a present value will reach a threshold value by a desired date, the number of successful paths (i.e. paths whose outcome exceeds the threshold value) is compared to the number of unsuccessful paths. This method of using a Monte Carlo simulation to predict the probability that an investment (or portfolio of investments, here "the required capital") of known value will reach a particular value by a particular future date is well known in the art. In like manner, the required capital is calculated according to known methods by setting the probability of exceeding the threshold value equal to a user-defined critical value and then solving for the value of the required capital necessary to achieve at least this probability of success. In one embodiment, this critical value is set equal to 75%.

After determining the required capital that provides a particular probability of achieving the financial goal, the next step is to calculate the entity's necessary required savings (160). First, however, the difference between the future value of the required capital and the future value of the entity's actual capital is determined. These future values are calculated using the desired date of financial goal achievement. This difference between the future value of the required capital and the future value of the actual capital is referred to as the capital deficit (150). The capital deficit represents the additional amount the entity must save, over and above the entity's current savings rate, in order to accumulate the required capital on or before the desired date of financial goal achievement.

The next step in calculating the required savings (160) is to calculate by any appropriate method a rate of annual savings starting in a first year such that, if the annual savings rate remains constant (but adjusted for inflation), and if the total accumulated savings are compounded at the future rate of return until the desired date of financial goal achievement, the future value of the total accumulated savings on the future date are equal to the future value of the capital deficit. The rate of annual savings in the first year thus determined is the required savings.

Generation of Metric

After determining the required capital and the required savings, the metric of financial status relative to a financial goal is generated. The first step in generating the metric is calculating a capital ratio (170) equal to the actual capital divided by the required capital. The minimum value of the capital ratio is zero (when the entity has no actual capital at all). The maximum value of the capital ratio is infinity (when the required capital is zero).

The second step in generating the metric is calculating a savings ratio (175) equal to the actual savings divided by the required savings. The minimum value of the savings ratio is zero (when the actual savings is zero, i.e. when the entity does not save any money per year at all). The maximum value of the savings ratio is infinity (when the required savings is zero).

Finally, the metric is generated (180) by adding the capital ratio to the savings ratio. The metric is equal to this sum, but may be scaled (or otherwise manipulated) higher or lower, such as by multiplication by a constant, without departing from the spirit of the invention. The metric is outputted (190) by an output device of the system, generally for review by the entity. The output device may be, without limitation, a display device (such as a computer screen) or a printer.

The metric allows an entity to measure its progress toward a financial goal, as opposed to the probability that the goal will be achieved. The metric, which is simply a number, provides entities with a simple, objective measurement of their financial status relative to a financial goal.

If the metric is exactly equal to one (before any scaling or other manipulation), the entity is exactly on pace, given its current annual savings rate, to achieve its financial goal. If the metric is less than one, the entity knows it must start saving more each year. The lower the metric is, the more the entity must begin saving. Conversely, if the metric is higher than one, the entity knows it is saving more than enough to achieve its goal. An entity in this fortunate situation would have the option of reducing its savings rate, although the more prudent choice would be to continue with the same savings rate and achieve the financial goal sooner than planned.

FI Score of an Individual

As mentioned above, in one embodiment of the invention the financial goal is financial independence of an individual (or group of individuals, including a married couple). Financial independence is the state of having a sum of invested assets and other resources that is alone sufficient to provide a desired income on a desired date, adjusted for inflation. In other words, financial independence occurs when an individual has sufficient income from his or her assets alone so that the individual does not have to work to achieve a desired standard of living. When the financial goal is financial independence, the metric is called an FI Score.

The process of generating the individual's FI Score begins when an individual uses an input device (such as keyboard and/or mouse) to enter entity data (110) (i.e. information about the individual and his finances) into the system. As seen in FIGS. 10A and 10B, the individual is prompted to answer a number of questions and to respond by entering data into an answer field. An answer field may be a text box, a check box, or the like. The exact questions the individual is prompted with are shown in FIGS. 10A and 10B, and relate generally to demographic data about the individual (e.g. age and gender), the individual's current finances (e.g. current income and savings, allocation of investments), and the individual's financial goal (e.g. age of achieving financial independence, desired standard of living at financial independence, whether assets will be consumed). The individual responds to all relevant prompts. Each of the individual's responses are stored in memory as variables for later use.

As explained previously, the system next performs preliminary processing (120) on the data entered by the individual. After the data is processed, it is incorporated into a simulation (130) of capital appreciation over time, based on historical inflation rates and rates of return. As explained previously, this simulation may be deterministic (such as based on an average historical average rate) or alternatively may be a Monte Carlo simulation.

Based on the results of the simulation, the required capital (140) and required savings (160) are calculated in the manner previously discussed. The capital ratio (170) and savings ratio (175) are then determined as explained above. Finally, the sum of the capital ratio and the savings ratio is equal to the individual's FI Score, which is a metric of the individual's progress toward achieving financial independence on a desired future date (here, when the individual is 55 years old). The FI Score is then outputted by the system.

Based on the data entered by the individual in FIGS. 10A and 10B, the individual's FI Score is 0.432. Given that the individual's actual capital (presumably) cannot be increased, the FI Score indicates that the individual must either start saving considerably more money, plan on achieving financial independence at an older age, or some combination of the two. By returning to the input screen of FIGS. 10A and 10B, the individual can enter hypothetical values for data related to his actual savings, his desired date of financial independence, and his desired income at financial independence. By varying these values until the FI Score is one or close to one, the individual can experiment with different savings rates to find out exactly how much more he should be saving to achieve various desired incomes by various future dates.

Figure 11:
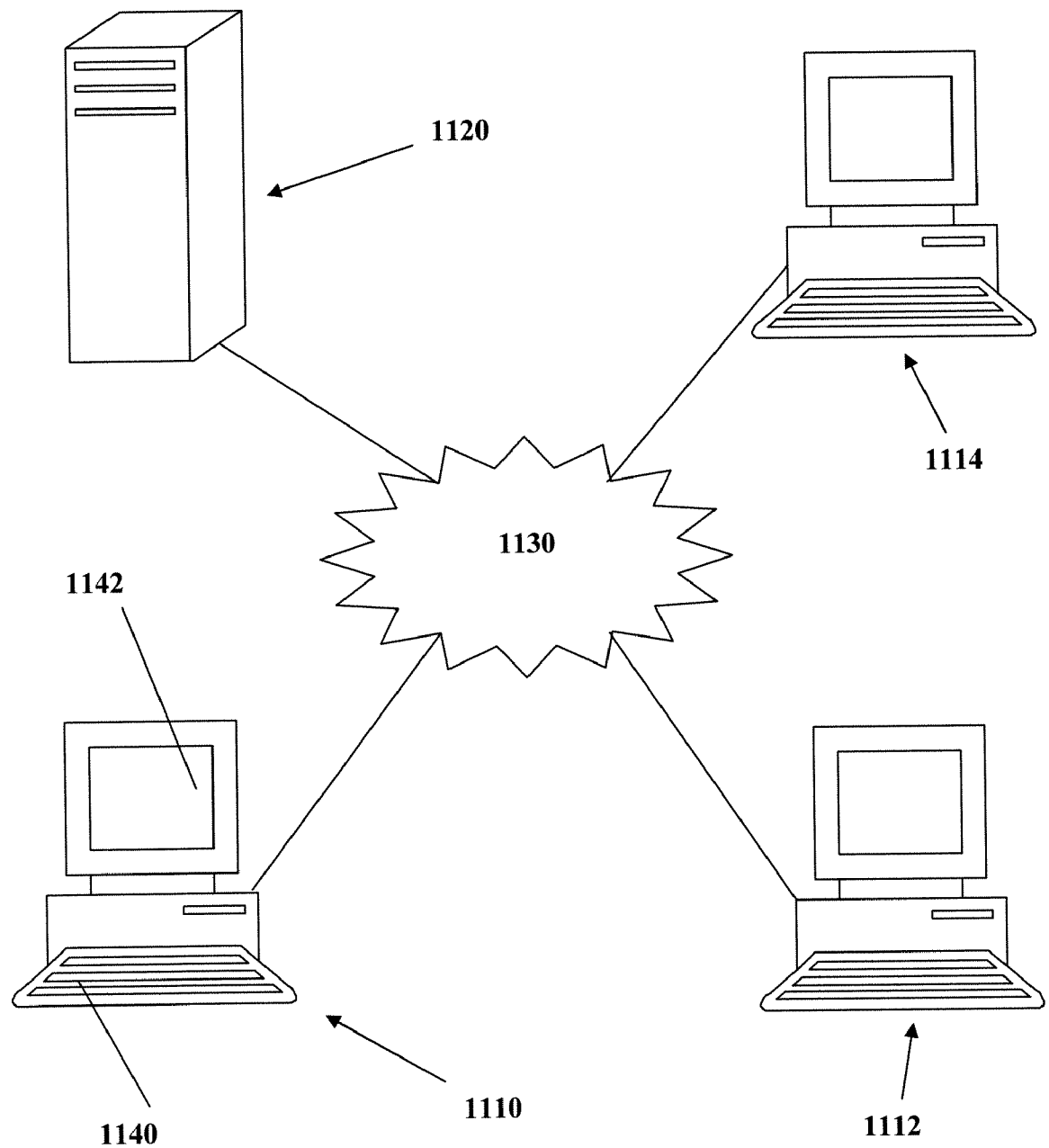
FIG. 11 shows a computer network including computers suitable for use in the present invention.

It is to be understood that the system of the present invention, in some embodiments, may be or include a computer 1110 or multiple computers 1110, 1112, 1114, and 1120 connected by a network 1130. As can be seen in FIG. 11, a computer 1110 has an input device 1140 and an output device 1142. The computer also contains at least a processor, memory, and processor operable instructions stored in the memory, as is well known in the art. The network 1130 connecting multiple computers may be any type of communication medium, including without limitation a local area network or the internet. Computers connected to the network may include personal computers 1110, 1112, 1114 and servers 1120, any of which may contain a memory, or a database in memory, for storing variables.

Various modifications and alterations of the invention will become apparent to those skilled in the art without departing from the spirit and scope of the invention, which is defined by the accompanying claims. It should be noted that steps recited in any method claims below do not necessarily need to be performed in the order they are recited. For example, in certain embodiments, steps may be performed simultaneously. The accompanying claims should be constructed with these principles in mind.

Any element in a claim that does not explicitly state "means for" performing a specified function or "step for" performing a specified function is not to be interpreted as a "means" or "step" clause as specified in 35 U.S.C. §112, ¶ 6.

What is claimed is:

1. A system for generating a score representing a metric of an entity's financial status relative to a financial goal, the system comprising:
    (a) an input device for inputting entity data, wherein said entity data comprises:
        i) a value of the entity's actual capital;
        ii) a value of the entity's actual savings;
        iii) a future date; and
        iv) a desired income of the entity on the future date;
    (b) a memory for storing said entity data;
    (c) instructions stored in said memory;
    (d) an output device; and
    (e) a processor for converting said entity data into a metric of the entity's financial status relative to the financial goal based on the instructions, wherein the instructions are operable on the processor to cause the system to:
        i) calculate a capital ratio being the present value of actual capital divided by the present value of a required capital;
        ii) calculate a savings ratio being actual annual savings divided by a required annual savings;
        iii) calculate a score being the sum of the capital ratio and the savings ratio; and
        iv) output the score sum from the output device;
    wherein the score is a single number that represents the entity's financial status relative to achieving financial independence by the future date.

2. The system of claim 1, wherein the entity data further comprises a value of the entity's current income.

3. The system of claim 1, wherein the entity is an individual and the entity data further comprises a value representing the gender of the individual.

4. The system of claim 1, wherein the instructions are operable on the processor to further cause the system to calculate a required capital.

5. The system of claim 4, wherein the required capital is calculated using a Monte Carlo simulation.

6. The system of claim 4, wherein the probability that the required capital will appreciate to a desired threshold value by the future date of financial independence is at least 75%.

7. A machine for generating a score representing a metric measuring the present progress of an entity relative to a financial goal to be achieved by a future date, the entity having an actual capital with a present value, the entity having an actual annual savings, the financial goal being associated with a required capital having a future value on the future date, the machine comprising:
    (a) a processor;
    (b) a computer-usable medium;
    (c) an output device;
    (d) a program code stored on the computer-usable medium and operable on the processor to cause the machine to:
        i) calculate a present value of the required capital;
        ii) calculate a capital ratio equal to the present value of the actual capital divided by the present value of the required capital;
        iii) calculate the future value of the actual capital on the future date;
        iv) calculate a capital deficit equal to the future value of the actual capital subtracted from the future value of the required capital;
        v) calculate a required annual savings that, when compounded at an annual rate until the future date, is equal to the capital deficit on the future date;
        vi) calculate a savings ratio equal to the actual annual savings divided by the required annual savings;
        vii) calculate a score equal to the sum of the capital ratio and the savings ratio; and
        viii) output the score from the output device, wherein the score is a single number that represents the entity's financial status relative to achieving financial independence by the future date.

8. A method of generating a score of the financial status of an entity relative to a financial goal to be achieved by a future date, the entity having an actual capital with a present value, the entity having an actual annual savings, the financial goal being associated with a required capital having a future value on the future date, the method comprising:
    (a) calculating a present value of the required capital;
    (b) calculating a capital ratio equal to the present value of the actual capital divided by the present value of the required capital;
    (c) calculating the future value of the actual capital on the future date;

(d) calculating a capital deficit equal to the future value of the actual capital subtracted from the future value of the required capital;

(e) calculating a required annual savings that, when compounded at an annual rate until the future date, is equal to the capital deficit on the future date;

(f) calculating a savings ratio equal to the actual annual savings divided by the required annual savings;

(g) calculating a score equal to the sum of the capital ratio and the savings ratio, wherein the calculating steps are performed by a computer processor; and (h) outputting the score from an output device, wherein the score is a single number that represents the entity's financial status relative to achieving financial independence by the future date.

* * * * *